(12) United States Patent
Kollmyer et al.

(10) Patent No.: US 7,376,831 B2
(45) Date of Patent: *May 20, 2008

(54) SELECTIVELY ENCRYPTING DIFFERENT PORTIONS OF DATA SENT OVER A NETWORK

(75) Inventors: Brad Kollmyer, Lynden, WA (US); Brian A. Baker, Mercer Island, WA (US); Eric Bradley Shapiro, Ann Arbor, MI (US); Aric Kollmyer, Mercer Island, WA (US); Mike Rutman, Gainesville, FL (US); Charles Duncan MacLean, Claremont, CA (US); Dan Robertson, Ann Arbor, MI (US); Neal Taylor, Yorba Linda, CA (US); Dick Hunsche, Ann Arbor, MI (US); Amanda Walker, Reston, VA (US)

(73) Assignee: Widevine Technologies, Inc., Seattle, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/467,510

(22) Filed: Aug. 25, 2006

(65) Prior Publication Data

US 2007/0101123 A1 May 3, 2007

Related U.S. Application Data

(63) Continuation of application No. 09/656,166, filed on Sep. 6, 2000, now Pat. No. 7,165,175.

(51) Int. Cl.
*H04L 9/00* (2006.01)

(52) U.S. Cl. .................................................. 713/154

(58) Field of Classification Search ................ 713/160, 713/154; 380/42, 283; 709/250, 246, 232
See application file for complete search history.

(56) References Cited

U.S. PATENT DOCUMENTS 4,172,213 A 10/1979 Barnes et al.

(Continued)

FOREIGN PATENT DOCUMENTS

EP 658054 B1 6/1995

(Continued)

OTHER PUBLICATIONS

"Establishing Interconnectivity among Various Makers' Products through Standardizatin of VOD Protocol", NTT Corporation Press Release, Sep. 27, 2002. http://www.ntt.co.jp/news/news02e/0209/020927.html.

(Continued)

*Primary Examiner*—Kambiz Zand
*Assistant Examiner*—Andrew L Nalven
(74) *Attorney, Agent, or Firm*—Darby & Darby P.C.; Jamie L. Wiegand

(57) ABSTRACT

An apparatus, system, and method are directed towards parsing and selectively encrypting different portions of data in real-time, decrypting the encrypted data in real-time, and passing the data to a media player on a client computer or other network capable device. Data in a network packet may be parsed into payload and non-payload portions. The payload portion of the packet data may then be examined to determine whether a predefined type of the data is recognized. For example, in one embodiment, the predefined data type may be media content. If the payload portion is recognized as a predefined data type, then it may be selectively encrypted. The selectively encrypted payload portion and non-payload portion of the packet may then be combined, such that the non-payload portion may be employed by firewalls, proxies, and/or NATs to route the packet towards the client computer or other network capable device.

17 Claims, 5 Drawing Sheets

U.S. PATENT DOCUMENTS

| | | | |
|---|---|---|---|
| 4,535,355 A | 8/1985 | Arn et al. |
| 4,694,489 A | 9/1987 | Frederiksen |
| 5,067,035 A | 11/1991 | Kudelski et al. |
| 5,134,656 A | 7/1992 | Kudelski |
| 5,144,663 A | 9/1992 | Kudelski et al. |
| 5,161,193 A | 11/1992 | Lampson et al. |
| 5,375,168 A | 12/1994 | Kudelski |
| 5,420,866 A | 5/1995 | Wasilewski |
| 5,444,782 A | 8/1995 | Adams et al. |
| 5,539,450 A | 7/1996 | Handelman |
| 5,549,869 A | 8/1996 | Iwakawa |
| 5,590,200 A | 12/1996 | Nachman et al. |
| 5,592,212 A | 1/1997 | Handelman |
| 5,621,799 A | 4/1997 | Katta et al. |
| 5,640,456 A | 6/1997 | Adams, Jr. et al. |
| 5,640,546 A | 6/1997 | Gopinath et al. |
| 5,666,412 A | 9/1997 | Handelman et al. |
| 5,678,002 A | 10/1997 | Fawcett et al. |
| 5,684,876 A | 11/1997 | Pinder et al. |
| 5,758,257 A | 5/1998 | Herz et al. |
| 5,774,527 A | 6/1998 | Handelman et al. |
| 5,774,546 A | 6/1998 | Handelman et al. |
| 5,796,836 A | 8/1998 | Markham |
| 5,799,089 A | 8/1998 | Kuhn et al. |
| 5,805,700 A | 9/1998 | Nardone |
| 5,805,705 A | 9/1998 | Gray et al. |
| 5,870,474 A | 2/1999 | Wasilewski et al. |
| 5,878,134 A | 3/1999 | Handelman et al. |
| 5,883,957 A | 3/1999 | Moline et al. |
| 5,892,900 A | 4/1999 | Ginter et al. |
| 5,910,987 A | 6/1999 | Ginter et al. |
| 5,915,019 A | 6/1999 | Ginter et al. |
| 5,917,912 A | 6/1999 | Ginter et al. |
| 5,920,625 A | 7/1999 | Davies |
| 5,920,861 A | 7/1999 | Hall et al. |
| 5,922,208 A | 7/1999 | Demmers |
| 5,923,666 A | 7/1999 | Gledhill et al. |
| 5,933,498 A | 8/1999 | Schneck et al. |
| 5,939,975 A | 8/1999 | Tsuria et al. |
| 5,943,422 A | 8/1999 | Van Wie et al. |
| 5,949,876 A | 9/1999 | Ginter et al. |
| 5,982,891 A | 11/1999 | Ginter et al. |
| 5,991,399 A | 11/1999 | Graunke et al. |
| 6,009,116 A | 12/1999 | Bednarek et al. |
| 6,009,401 A | 12/1999 | Horstmann |
| 6,009,525 A | 12/1999 | Horstmann |
| 6,021,197 A | 2/2000 | von Willich et al. |
| 6,021,199 A | 2/2000 | Ishibashi |
| 6,035,037 A | 3/2000 | Chaney |
| 6,038,433 A | 3/2000 | Vegt |
| 6,044,468 A | 3/2000 | Osmond |
| 6,049,671 A | 4/2000 | Slivka et al. |
| 6,055,503 A | 4/2000 | Horstmann |
| 6,073,256 A | 6/2000 | Sesma |
| 6,112,181 A | 8/2000 | Shear et al. |
| 6,138,119 A | 10/2000 | Hall et al. |
| 6,141,686 A | 10/2000 | Jackowski et al. |
| 6,154,840 A | 11/2000 | Pebley et al. |
| 6,157,721 A | 12/2000 | Shear et al. |
| 6,178,242 B1 | 1/2001 | Tsuria |
| 6,185,683 B1 | 2/2001 | Ginter et al. |
| 6,189,097 B1 | 2/2001 | Tycksen, Jr. et al. |
| 6,191,782 B1 | 2/2001 | Mori et al. |
| 6,226,281 B1 | 5/2001 | Cordier et al. |
| 6,226,794 B1 | 5/2001 | Anderson, Jr. et al. |
| 6,237,786 B1 | 5/2001 | Ginter et al. |
| 6,240,185 B1 | 5/2001 | Van Wie et al. |
| 6,247,950 B1 | 6/2001 | Hallam et al. |
| 6,253,193 B1 | 6/2001 | Ginter et al. |
| 6,256,668 B1 | 7/2001 | Slivka et al. |
| 6,272,636 B1 | 8/2001 | Neville et al. |
| 6,285,985 B1 | 9/2001 | Horstmann |
| 6,292,569 B1 | 9/2001 | Shear et al. |
| 6,298,441 B1 | 10/2001 | Handelmann et al. |
| 6,314,409 B2 | 11/2001 | Schneck et al. |
| 6,314,572 B1 | 11/2001 | LaRocca et al. |
| 6,334,213 B1 | 12/2001 | Li |
| 6,363,488 B1 | 3/2002 | Ginter et al. |
| 6,389,402 B1 | 5/2002 | Ginter et al. |
| 6,405,369 B1 | 6/2002 | Tsuria |
| 6,409,080 B2 | 6/2002 | Kawagishi |
| 6,409,089 B1 | 6/2002 | Eskicioglu |
| 6,415,031 B1 | 7/2002 | Colligan et al. |
| 6,424,717 B1 | 7/2002 | Pinder et al. |
| 6,427,140 B1 | 7/2002 | Ginter et al. |
| 6,427,169 B1 | 7/2002 | Elzur et al. |
| 6,449,367 B2 | 9/2002 | Van Wie et al. |
| 6,449,651 B1 | 9/2002 | Dorfman et al. |
| 6,449,719 B1 | 9/2002 | Baker |
| 6,459,427 B1 | 10/2002 | Mao et al. |
| 6,466,670 B1 | 10/2002 | Tsuria et al. |
| 6,505,299 B1 | 1/2003 | Zeng et al. |
| 6,587,561 B1 | 7/2003 | Sered et al. |
| 6,618,484 B1 | 9/2003 | Van Wie et al. |
| 6,629,243 B1 | 9/2003 | Kleinman et al. |
| 6,634,028 B2 | 10/2003 | Handelmann |
| 6,640,304 B2 | 10/2003 | Ginter et al. |
| 6,643,298 B1 | 11/2003 | Brunheroto et al. |
| 6,651,170 B1 | 11/2003 | Rix |
| 6,654,420 B1 | 11/2003 | Snook |
| 6,654,423 B2 | 11/2003 | Jeong et al. |
| 6,658,568 B1 | 12/2003 | Ginter et al. |
| 6,668,325 B1 | 12/2003 | Collberg et al. |
| 6,931,532 B1 | 8/2005 | Davis et al. |
| 7,151,832 B1 | 12/2006 | Fetkovich et al. |
| 2002/0001385 A1 | 1/2002 | Kawada et al. |
| 2002/0015498 A1 | 2/2002 | Houlberg et al. |
| 2002/0021805 A1 | 2/2002 | Schumann et al. |
| 2002/0089410 A1 | 7/2002 | Janiak et al. |
| 2002/0104004 A1 | 8/2002 | Couillard |
| 2002/0141582 A1 | 10/2002 | Kocher et al. |
| 2003/0007568 A1 | 1/2003 | Hamery et al. |

FOREIGN PATENT DOCUMENTS

| | | |
|---|---|---|
| EP | 714204 B1 | 5/1996 |
| EP | 0840518 | 5/1998 |
| EP | 0886409 A2 | 12/1998 |
| WO | WO-9526595 | 10/1995 |
| WO | WO-96/06504 A1 | 2/1996 |
| WO | WO-96/32702 A1 | 10/1996 |
| WO | WO-99/30499 A1 | 6/1999 |
| WO | WO-99/54453 A1 | 10/1999 |
| WO | WO-01/35571 A1 | 5/2001 |
| WO | WO-01/93212 A2 | 12/2001 |
| WO | WO-02/21761 A2 | 3/2002 |

OTHER PUBLICATIONS

Griwodz, Carsten, "Video Protection by Partial Content Corruption", Multimedia and Security Workshop at ACM Multimedia, Bristol, UK, pp. 1-5, Sep. 1998.

Eskiciouglu, A. and Delp, E., "An overview of multimedia content protection in consumer electronics devices", SP:IC, 16(7): pp. 681-699, Apr. 2001.

Spanos, George, et al., "Performance Study of a Selective Encryption Scheme for the Security of Networked, Real-Time Video", Proceedings of the 4th ICCN, Las Vegas, NV, pp. 2-10, Sep. 1995.

Intelligent Systems for Finance and Business, Goonatilake, Suran, ed. et al., Chapters 2-10, pp. 31-173, 1995.

"Irdeto Access & Optibase create Strategic Alliance", Press Release, Optibase, pp. 1-4, Dec. 14, 2000. http://www.irdetoaccess.com/press/0000041.htm.

Blumenfeld, Steven, "System Security, Streaming Media", Broadcast Engineering magazine, pp. 1-2, Oct. 2001.

Forrest, S., "Research Projects", pp. 1-3, Dec. 2, 2003. http://www.cs.unm.edu/~forrest/projects.html.

Cheng, H.C.H., "Partial Encryption for Image and Video Communication", Department of Computing Science, University of Alberta, pp. 1-87, Fall, 1998.

Hunter, J., et al., "A Review of Video Streaming Over the Internet", DSTC Technical Report TR97-10, pp. 1-28., Aug. 1997.

Schulzrinne, H., et al., Real Time Streaming Protocol (RTSP), RFC 2326, pp. 1-86, Apr. 1998.

"Irdeto Access & Optibase create Strategic Alliance", Press Release, Optibase, pp. 1-2, Dec. 14, 2000. http://www.optibase.com/html/news/December_14_2000.html.

Yoshida, Kazuhiro, et al., "A Continuous-media Communication Method for Minimizing Playback Interruptions", IS&T/SPIE Conference on Visual Communications and Immage Processing, Jan. 1999, San Jose, California, vol. 3653.

Communication pursuant to Article 96(2) EPC dated Jan. 26, 2006.

Wu, Tsung-Li et al., Selective Encryption and Watermarking of MPEG Video (Extended Abstract), Feb. 17, 1997, International Conference on Image Science, Systems, and Technology, 10 pgs.

Alattar, A. and Al-Regib, G., "Evaluation of selective encryption techniques for secure transmission of MPEG-compressed bitstreams," IEEE Int. Symp. On Circuits and Systems (May 30, 1999 -Jun. 2, 1999). vol. 4, pp. 340-343.

Kunkelmann, T. and Reinema, R., "A Scalable Security Gateway for Multimedia Communication Tools", IFIP WG 6.1 International Working Conference on Distributed Applications and Interoperable Systems (DAIS'97), Cottbus, Germany, Oct. 1997.

Kunkelmann, T., "Applying Encryption to Video Commu nication", 6th ACM International Multimedia Conference, Workshop Multimedia and Security, Bristol, UK, Sep. 1998.

ETSI Technical Report, ETR 289, "Digital Video Broadcasting (DVB); Support for use of scrambling and Conditional Access (CA) within digital broadcasting systems", Oct. 1996.

Kunkelmann, T. and Horn, U., "Video Encryption Based on Data Partitioning and Scalable Coding - A Comparison," T. Plagemann and Goebel, V. (Eds): IDMS '98 LNCS 1483 pp. 95-106, 1998.

Kunkelmann, T., Reinema, R., Steinmetz, R., and Blecher T., Evaluation of Different Video.

Kunkelman, T., Vogler, H. Moschgath, M-L and Wolf, L., "Scalable Security Mechanisms in Transport Systems for Enhanced Multimedia Services," in Multimedia Applications, Services and Techniques, ECMAST, 98, pp. 207-220, 1998.

Herbison, B.J., "Low Cost Outboard Cryptographic Support for SILS and SP4," In 13th National Computer Security Conference proceedings, pp. 286-295, Oct. 1989.

Agi, I. and Gong, L., "An Empirical Study of Secure MPEG Video Transmissions," Proc. of SNDSS '96, 1996.

U.S. Appl. No. 60/128,224, filed Apr. 7, 1999.

U.S. Appl. No. 60/131,162, filed Apr. 26, 1999.

Wu, S. and Wu, T., "Run-Time Performance Evaluation for a Secure MPEG System Supposrting Both Selective Watermarking and Encryption" JSAC, Mar. 1, 1997.

Shi, C. and Bhargave, B., "An Effcient MPEG Video Encryption Algorithm", IEEE, pp. 381-386, 1998.

Qiao and Nahrstedt, "Comparison of MPEG Encryption Algorithms", Computer & Graphics, vol. 22, No. 4, pp. 437-448, 1998.

Tang, L., "Methods for Encrypting and Decrypting MPEG Video Efficiently", Proc. ACM Multimedia 96, pp. 219-229, Nov. 18-22, 1996.

Wu, C-P, and Kuo, C-C., "Fast Encryption Methods for Audiovisual Data Confidentiality", Proc SPIE, vol. 4209, pp. 284-295, 2001.

Request for *Inter Partes* Reexamination of U.S. Patent No. 7,165,175, requested by Verimatrix, Inc., Dec. 3, 2007.

SELECTIVELY ENCRYPTING DIFFERENT PORTIONS OF DATA SENT OVER A NETWORK

CROSS-REFERENCE TO RELATED APPLICATION

This utility patent application is a continuation U.S. patent application Ser. No. 09/656,166 filed on Sep. 6, 2000, and entitled "Apparatus, System And Method For Selectively Encrypting Different Portions Of Data Sent Over A Network," the benefit of which is claimed under 35 U.S.C. §120, and is further incorporated herein by reference.

BACKGROUND OF THE INVENTION

1. Field of the Invention

The present invention generally relates to transmission of data over a network and, more specifically, to an apparatus, system and method for selectively encrypting and decrypting different portions of data sent over a network.

2. Description of Related Art

Networking, today exemplified by the Internet, began as a way for users to share text-based information and files. The technology has, however, advanced far beyond text. The Internet can be used to conduct videoconferences where the participants in the conference can see each other in real-time on their computer screens or network-connected conferencing device. Internet users can watch live video footage of events as they happen, or view pre-recorded programming "on demand," i.e., whenever they choose rather than on a broadcast schedule.

To understand how video and multimedia content is transmitted over the Internet, first it is necessary to understand the concept of streaming. Streaming solves a long-standing problem inherent in transmitting media information across the Internet: multimedia files are quite large, and most users have relatively low bandwidth network connections. Sending broadcast-quality video or CD-quality audio across the Internet has never been easy or practical. It could take hours to send a single audio or video file across the network to someone's computer. The person at the other end would have to wait until the entire file was downloaded before playback could begin. Playback might last only a few minutes.

It has long been possible to reduce the amount of data required to transmit multimedia material. One way is to reduce the resolution, frame rate or sampling rate of the transmitted data, which has the side effect of reducing the perceived quality of the audio or video content. Another commonly used method is to apply data compression to the data to remove redundancies and retain only the most essential data from a multimedia file. By combining these two techniques, it is possible to produce multimedia files of reasonable quality that can be transmitted over typical Internet connections in time frames similar to the running time of the media content itself, i.e. minutes instead of hours. The actual quality of downloaded multimedia material varies depending on the available network bandwidth and the willingness of the user to wait for it to arrive; it is possible to trade off quality against file size and to prepare higher-quality versions of the content for users with more bandwidth.

When the amount of data per second of multimedia content is equal to or less than the amount of bandwidth available to a network user, streaming can occur. Streaming is essentially "just-in-time" delivery of multimedia data. The user does not need to wait for the entire file to arrive before s/he can begin viewing it, nor does s/he need to dedicate a large piece of his/her computer's storage to the received data. As it arrives at the client computer, the multimedia data is typically stored in a buffer capable of holding several seconds' worth of data, in order to avoid interruptions in playback caused by erratic network connections. When the buffer is initially filled, which happens in seconds rather than minutes or hours, playback begins, and individual frames of video and/or audio segments are retrieved from the buffer, decoded, and displayed on the client's video monitor, played through the client's sound system, or otherwise played back via the client's network connected device. After the data has been played, it is in many cases discarded and must be transmitted again if the user wishes to review a previous portion of the program.

The World Wide Web ("Web") operates on a client/server model; that is, a user (i.e. a client) runs a piece of software on his/her personal computer or other network device (such as a network appliance or Internet capable wireless phone) capable of accessing the resources of a network server. The server can allow many different users to access its resources at the same time and need not be dedicated to providing resources to a single user. In this model, the client software, e.g. a browser or player, runs on the user's computer. When a user requests a video or other multimedia content on the Web, his/her client software contacts the Web server containing the desired information or resources and sends a request message. The Web server locates and sends the requested information to the browser or player, which displays the results by interpreting the received data as appropriate, e.g. displaying it as video on the computer's display.

Information on the Web is addressed by means of Uniform Resource Locators (URLs). A URL specifies the protocol to be used to access the required information (commonly HTTP, the HyperText Transfer Protocol), the address or Internet name of the host containing the information, any authentication information required to gain access to the information (such as a User ID and Password), an optional TCP/IP port number if the resource is not available on the standard port for the specified protocol, and a path to the desired information in a virtual hierarchy designated by the server operators. Additionally, the URL can contain information entered by the user such as query text for a database search. URLs can be specified in many ways, including but not limited to typing them into a Web client, by clicking a "hyperlink" in some other Web document, by choosing a "bookmark" in a Web browser to return to a previously-visited page, or by filling out a Web form and submitting it to the server.

When a request is made for a particular URL, the request is sent to the appropriate server using the protocol indicated in the URL, such as HTTP, and the requested data (or an error message if the request cannot be fulfilled) is returned by the same method. However, HTTP and other Web protocols are built on top of fundamental Internet protocols, such as TCP (Transmission Control Protocol) or UDP (User Datagram Protocol). The protocols used for streaming media are built on top of these fundamental protocols in the same way that other high-level protocols, such as HTTP, are. It is essential to realize that all Internet traffic is carried by a relatively small number of low-level, fundamental protocols such as TCP and UDP, which are used to establish the connection between computers that carry the higher-level protocol. When streaming multimedia content, then, the server may use either TCP or UDP.

RTP (Real-Time Protocol), RTSP (Real-Time Streaming Protocol), RTCP (Real-Time Control Protocol) are three of the many possible streaming media protocols that can be built on top of the Internet's low-level protocols. In fact, RTP, RTSP, and RTCP serve complimentary functions and are most often used together as part of some of the more common streaming implementations. RTSP is used to set up and manage a streaming connection between a server and a client, RTP is used to deliver the actual multimedia data, and RTCP provides timing and other control signals between the client and the streaming server. Often, RTP is sent on top of UDP, a low-overhead protocol that delivers the data as quickly as possible, but does not guarantee that any particular piece of data (a "packet" in network terminology) will actually arrive at its destination. RTCP packets are sent interleaved with the data or in parallel with the RTP media channel via TCP.

One serious drawback of using the Internet for the distribution of streaming media is that the data of necessity often passes through networks and systems that are not controlled by the sender of the data en route to the client. Once the data leaves the sender's protected network, it is vulnerable to interception. This is of particular concern when proprietary data, such as a motion picture, is transmitted across the network, be it the public Internet or a third party private network. The data can potentially be intercepted and copied at any point as it is transmitted across these networks. Without some way to protect data from interception and unauthorized duplication, the Internet will never provide the security necessary to allow copyright owners to safely distribute their works over the network.

Encryption is one way to address this issue. Encryption provides a way to encode information such that only the intended recipient can view it. While anyone can intercept the data, only the legitimate recipient will be able to decrypt it, retrieve the original message or media content, and display it. Many encryption solutions have been created to provide this type of security. For example, software referred to as VPN (Virtual Private Network) allows a group of computers connected to the Internet to behave as if they were connected to a physically secure local network, using encryption to ensure that only computers on the VPN can access the private network resources. Other applications of encryption to allow private communications over the Internet include but are not limited to PGP (Pretty Good Privacy), IPSec (IP Security) and SSL (Secure Sockets Layer).

Organizations, often but not limited to corporations, also protect their proprietary data by use of firewalls. Every time a corporation connects its internal computer network or local area network (LAN) to the Internet, it faces a similar problem of private data being intercepted. Whereas encryption is used to ensure that data sent through the public Internet is usable only by intended recipients, firewalls are aimed at keeping proprietary information secure on a LAN which is connected to the Internet by preventing unauthorized users from accessing information stored on the internal network via the public Internet. Due to the Internet's public nature, every LAN connected to it is vulnerable to attack from the outside. Firewalls allow anyone on the protected LAN to access the Internet in ways allowed by the firewall configuration, while stopping hackers on the Internet from gaining access to the LAN and stealing information and/or deleting or otherwise vandalizing valuable data.

Firewalls are special-purpose devices built on routers, servers, and specialized software. One of the simplest kinds of firewalls uses packet filtering. In packet filtering, a router screens each packet of data traveling between the Internet and the LAN by examining its header. Every TCP/IP packet has a header containing the IP address of the sender and receiver as well as the port number of the connection and other information. By examining the header, and particularly the port number, the router can determine with a fair amount of accuracy the type of Internet service each packet is being used for. Each Internet service, including HTTP (the Web), FTP (File Transfer Protocol), Telnet, rlogin, and many others, has a standard port number that is used by convention for most access to the service. While any port number can be used for any service, it is far more convenient for users to use the standard port numbers, and virtually all Internet services intended for access by the public do so. Once the router knows what client and what service a packet is intended for, it can simply block outside access to hosts and services that public Internet users should not be able to use. System administrators set the rules for determining which packets should be allowed into the network and which should be blocked.

Proxy servers are commonly used in conjunction with firewalls. A proxy server is a software gateway that runs on a computer that is accessible by both the protected LAN and the Internet. All access to the Internet from the LAN must go through the proxy server, as must all access to the LAN from the public Internet. When a computer on the LAN requests an Internet resource such as a Web page, that request is sent to the proxy server. The proxy server then makes the request to the Internet resource and forwards any returned data back to the original requester on the LAN. Since the Internet and the LAN touch only at the single point of the proxy server, which acts as a go-between, protecting the network involves securing only one computer, rather than dozens or hundreds. Proxy servers are frequently used by employers to control and monitor how their employees use the Internet, as well as for preventing intrusion attempts from the Internet.

NAT, the term used for networks that utilize Network Address Translation, complicates delivery of Internet data as well. In a NAT, a privately addressed network is established separated from the Internet by a NAT router. This router in turn has an address on the public Internet. By translating the addresses of the private network into addresses recognizable on the public Internet and vice versa, the NAT router facilitates Internet connectivity for the privately networked machines. NATs are often used where limited numbers of public addresses are available in comparison to the number of users (a user might use a NAT for multiple machines sharing a cable modem connection) or in conjunction with firewalls and/or proxies to provide an extra layer of security to the private network.

Data packets can be typically divided into two parts, the header and the payload parts. The header is the portion of the packet that includes routings or other configuration information. The payload is the portion of the data packet that is just the data of interest, in exemplary case: multimedia content. For example, in a network packet, the header contains data for use by network routers in delivering the packet to its final destination, as well as other data about the packet such as size and formatting information. In an exemplary RTP packet, the header contains channel information as well as other information needed by the player to direct the RTP (media content) payload. Some complex packets may contain multiple headers and diverse nonpayload information and will be referred to herein as the non-payload part.

Many current encryption solutions, such as IPsec, encrypt data far too indiscriminately, encrypting not only the payload but portions of the header or nonpayload part as well.

Only the routing information remains unencrypted, thereby rendering information needed for firewalls, proxies and/or NATs to appropriately relay the packets scrambled which will stop the packet before it can transit into a private or protected network. Other solutions provide inadequate encryption to assure integrity of the data across the public network. Some streaming media encryption solutions deal with the problem by placing the encryption system on the server machine in the form of special software that encrypts the streaming media before it is converted to packets for network transmission. While this results in packets that can often successfully pass through proxy servers and firewalls, this strategy is limiting. This is because this solution requires modification of the streaming server and often requires the addition of extra streaming servers or processing capacity to handle the increased workload that encryption adds. Also, the solution must be reengineered for each streaming server platform supported.

BRIEF SUMMARY OF THE INVENTION

The present invention solves the above and other problems by providing an apparatus, system and method that parse and selectively encrypt different portions of the data in real-time, decrypt the encrypted data in real-time and pass the data to a media player on a client computer or other network capable device. In particular, there is provided an encryption bridge that examines, parses and selectively encrypts only the payload (e.g. Media content) portion of the data, leaving the non-payload portion intact such that the data can cross firewalls, proxies and NATs without the firewalls, proxies or NATs having to be modified to accommodate the encrypted data. The invention ensures that it does not encrypt the portion of the data stream that firewalls, proxies, and NATs require to properly deliver the data to the intended recipients (e.g. Client computer). Thus, if the encryption unit does not see a data type that it specifically recognizes, then it ignores it, but if the encryption unit sees a data type that it does recognize (e.g. Multimedia content), then it selectively encrypts only the recognized portion of the data stream.

BRIEF DESCRIPTION OF THE SEVERAL VIEWS OF THE DRAWING

The accompanying drawings, which are incorporated in and constitute a part of this specification, illustrate at least one exemplary embodiment of the invention and, together with the description, explain the various advantages and principles of the invention. In the drawings.

DETAILED DESCRIPTION OF THE INVENTION

The following detailed description refers to the accompanying drawing, which illustrates the exemplary embodiment of the present invention. Other embodiments are possible and modifications may be made to the exemplary embodiments without departing from the spirit and scope of the invention. Therefore, the following detailed description is not meant to limit the invention. Rather, the scope of the invention is defined by the appended claims.

Figure 1:
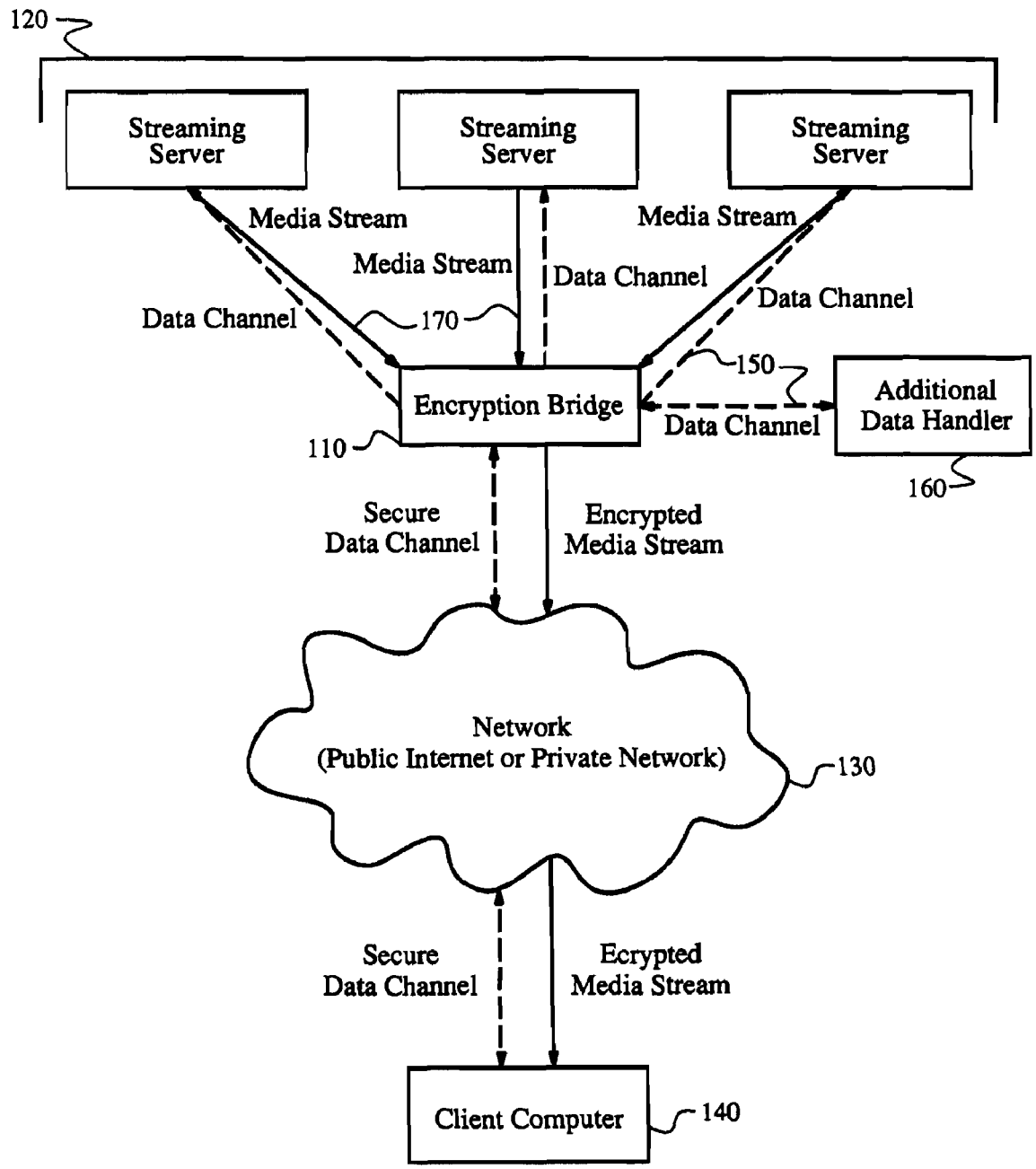
FIG. 1 is an illustration of an exemplary computer system on which an encryption bridge may be implemented.

FIG. 1 illustrates an exemplary computer system 100 which includes an encryption bridge (also referred to as "EB") 110 of the invention interposed between the streaming servers 120, which provide media streams (payload data) 170, and an outside network such as the Internet 130, and a user or client computer 140. The EB 110 operates such that as data is sent through EB 110, only selected portion of the data (e.g., multimedia data) are encrypted. The EB 110 can be set up such that it encrypts other data as well. For example, the EB 110 can be configured to encrypt/protect data that might include but is not limited to electronic books, medical records or images, financial data or any other data that requires secure transmission over a network.

The EB 110, which may represent a single machine or a cluster of machines, is interposed between servers 120 and the Internet 130. All pertinent data moving from the servers 120 and the Internet 130 via the EB 110 needs to be made secure by encryption; traffic between the EB 110 and the servers 120, however, does not have to be encrypted since it is in a "safe zone" by virtue of not being exposed to the outside network. Data channels 150 may represent control data such as pause, play and rewind or speed modulation data for the streaming servers 120 or can be used for more complex data forms and monitoring. Additionally, the data channels 150 can be used to hand this monitoring data off to other machines such as e-commerce or quality monitoring servers for services not directly related to the stream encryption process.

The EB 110 passes data to network clients 140 and ensures that the data owners or content providers (e.g. Yahoo, Inc., AOL, Inc., etc.) that the data from their streaming servers 120 will be securely encrypted while traversing the Internet 130 and that once on the client machine 140 the data will be difficult to copy. Security on the client machine 140 can be accomplished by a variety of techniques, including but not limited to checking for and preventing known piracy techniques and monitoring the client machine 140 for suspicious behavior. The streaming servers 120 and the clients 140 are the ultimate sources and destinations, respectively, of the data streams (e.g. multimedia content) 170 and data channels (e.g. control data) 150 transported via the EB 110. An additional data handler (e.g. e-commerce system, quality monitoring system, etc.) 160 may also be connected to the EB 110, which is farther described below.

The streaming server 120 operators (e.g. content owners or service providers to content owners) are the system's primary customers, which provide the content to transmissions requested by a client 140 over a network such as the Internet 130. The client 140, for the purpose of this example, is equipped with media playback software. For this example, the media playback software could be the Apple Computer Quicktime™ Player, Real Player™, the Windows Media Player™ or any other software capable of playing back multimedia streams. The Internet 130 is a public network. The data handler 160 is, for example, an e-commerce system or other outside monitoring or data system that a customer may choose to utilize in conjunction with a streaming security solution.

Figure 2:
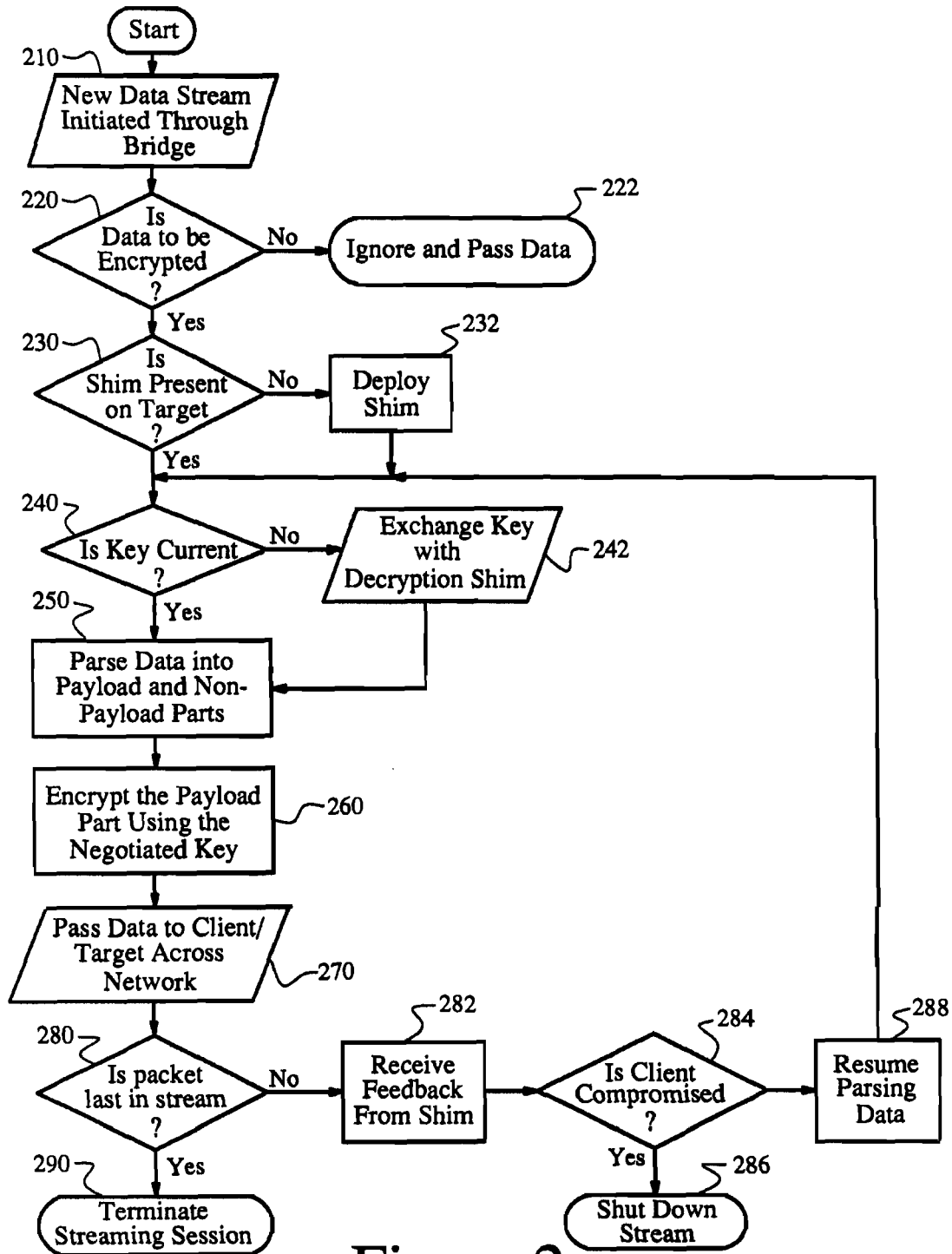
FIG. 2 is a flowchart of an exemplary encryption process.

FIG. 2 is a flowchart of an exemplary encryption process of the invention for parsing and selectively encrypting data being sent over a public network between a server and a client. This process comprises recognizing a new data stream arriving at the EB 210; determining whether the data is to be encrypted 220; ignoring and passing the data stream if it is not to be encrypted 222; determining whether a shim is present on the client/target 230; deploying the shim if it is not already present 232; determining whether an encryption key is current 240; exchanging encryption key(s) with the client side shim if the key was not current 242; parsing data into payload and non-payload parts 250; encrypting the payload part using the exchanged key 260; passing the data consisting of payload and non-payload parts across the network 270; determining whether the processed data is last in the stream 280; receiving feedback from the shim if the data was not the final part of the stream 282; determining if the client is compromised 284 (e.g. is hacked or the data needing security is otherwise placed at risk); shutting down the data stream if the client is compromised 286; resuming the parsing of the established stream if the client is not compromised 288; and terminating the streaming session if the data was the last in the stream 290.

Benefits of the EB system include: the EB fits beside the customers' streaming server system with minimal integration costs; there is no need to modify the server system for the EB to work; the EB is transparent to both client side software and the streaming server system with client software appearing to communicate with the servers without an unexpected intermediary and servers delivering data to clients without detecting the ongoing encryption process.

In addition, the EB system provides parsing and encryption for a variety of data types and streams including but not limited to Windows Media™ format and RTP/RTSP using TCP, TCP/UDP or http delivery. All payload data sent via these formats are encrypted as the data travels from the server through the EB to the client.

Encryption is accomplished via an encryption algorithm such as DES-X, a technique well known in the art, and other algorithms can be substituted depending on customer and other needs. The parsing and encryption of the data streams does not interfere with the stream's ability to pass through proxy server, firewalls or NATs that parse packets to facilitate delivery of data to a protected LAN. This is an important feature of the invention since the applicants are not aware of any software that parses for content on a selective basis and subsequently acts on just the payload part of the data like the present invention. Moreover, outside authentication is not required since the EB handles exchange of encryption keys directly with the client.

In addition, the EB is scalable to allow the addition of more encryption machines as the bandwidth increases. The encryption machines are scalable to allow the addition of additional processor and network cards to handle increased bandwidth. This allows the system maximum growth with minimal increase in the physical size of the EB.

As more encryption machines are added to the EB, the encryption is spread out among those available encryption machines to maximize throughput. The EB can be configured while it is online to: add or remove encryption machines; shutdown the EB; prevent the system from accepting new streams and allow existing streams to run out; read status to tell that a given encryption machine is no longer servicing streams and can be safely removed from the system; and gather data on streaming capacity, usage and quality of data transferred via the EB.

In addition, the EB and shim architecture provide pluggable cores for changing and maintaining features such as the encryption algorithm and client side security monitors. A pluggable core is modular code that allows portions of the whole program to be readily replaced without disturbing the remaining functionality. For example, the invention allows the EB to encrypt with a variety of algorithms such that when a new data stream is established through the EB, a new encryption core could be sent to the client to allow the payload part to be encrypted with a different algorithm (e.g. Blowfish or RSA™ instead of DES-X). Stated another way, the encryption algorithm can be changed at any time since the software architecture is entirely pluggable/exchangeable. As to the key exchange system, though currently standard protocols are used, they can be changed at any time since this architecture is also pluggable/exchangeable. As to the client side security system (i.e. hacker detection), this too can be altered at any time since the architecture is pluggable/exchangeable. All core functionality of the client side shim is implemented via this pluggable/exchangeable architecture.

Another novel aspect of the invention is the "on-the-fly" encryption, which makes data packets that are transmitted over the network useless to any computer other than the intended machine. This is done transparently relative to the client media playback mechanism (e.g. media player software) and server and in real-time. The initial implementation of the invention utilizes DES-X, a speed optimized algorithm well-known in the art, though via the pluggable core architecture noted above this could be changed out for other algorithms that may include but are not limited to RSA™ algorithms or the widely known Blowfish and Two-Fish algorithms.

Thus, the invention provides a software bridge that examines network data passing through, parses the network data and only encrypts the relevant payload part, leaving the non-payload part that may include data such as routing, size and other header data surrounding the payload part entirely untouched. In other words, certain portions of the data are encrypted and other portions of the data are not or do not need to be encrypted. What the systems and methods of the invention do is parse the network and actually look at the data format, encrypting only the portion of the data that contains, in the exemplary case, multimedia content. Selectivity of the data to be encrypted is based on the format of the data sent, which the EB recognizes and responds to appropriately. The EB of the invention sits in between the servers and clients and encrypts the data. Decryption takes place on the client using the shim and pluggable cores as noted above. This way, the data if intercepted on the network is encrypted and useless to the interceptor. The data cannot be intercepted prior to encryption since the EB and servers are connected via a secure network connection.

As stated above, the encrypted data stream of the invention can pass through a proxy server, firewall or NAT without those mechanisms needing to be modified to accommodate the data stream. A benefit of the invention over current encryption solutions is the ability to produce encrypted data streams that can cross through proxy servers, firewalls and NATs. This ability to produce data that crosses unmodified proxy servers, firewalls and NATs results from the invention's ability to selectively parse data into payload and non-payload parts and encrypt only the payload part, a level of selectivity that current encryption solutions do not provide.

For the streaming server operators this becomes very significant since many home, office and other networks are protected or isolated from the public Internet by firewalls, proxy servers and/or NATs. With current encryption solutions that encrypt data less discriminately, the data is unable to be delivered across unmodified firewalls, proxy servers and NATs.

For instance, when a user requests data from a streaming server, that data stream is organized into packets that have specific data for identifying the target user. Without accurately parsing the data into payload and non-payload parts, the user specific data is readily damaged or scrambled during the encryption process, making it impossible for the firewall, proxy server or NAT to deliver the data to the requesting user. In contrast, the present invention accurately separates the payload and non-payload parts, encrypting only the payload part so that the data appears unchanged to the firewall, proxy server or NAT that requires only the non-payload part to affect delivery to the user requesting the data stream.

A firewall, for example, does not recognize or try to block the encrypted data stream because the transport protocols do not define the appearance of the payload part, only the appearance of the non-payload part. The firewall looks at the nonpayload part including but not limited to size, routing and header data. If the nonpayload part data identify the data stream as a reply to a user request, then firewall determines that the data stream is not malicious in origin and will not prevent it from going through. However, if the firewall is unable to parse the non-payload part or does not recognize the non-payload part than the data will be blocked from passing through.

In existing encryption solutions where the entire data portion of packets is encrypted, special modifications in each firewall, proxy server or NAT that the data stream might pass through are necessary. That is, the firewalls, proxy servers and NATs would have to be updated to identify the encrypted data. The present invention does not require modifications of the firewalls, proxy servers or NATs already deployed because it selectively encrypts the data packets leaving the portions important to firewalls, proxy servers and NATs unchanged such that the firewall, proxy server or NAT can pass the data stream to the intended target.

Some existing encryption solutions exist that encrypt only the media portion of a data stream by placing the encryption software on the streaming server as a plug-in to streaming server software, placing a heavy processing burden on the streaming server. This is in contrast to a benefit of the invention in that the invention can be used with a plurality of streaming servers without modification being required to the streaming servers and providing encryption without impacting the processing performance of the streaming servers.

Another feature of the invention is it provides a system that is independent in terms of the media format used. That is, the invention operates based on data protocol rather than file format. Multimedia streaming over networks is accomplished via several protocols. The invention recognizes the streaming protocol and acts on the data rather than requiring specific identification of the file format being transmitted. The invention is also independent in terms of the operating systems on the server machines since the invention requires no direct access to the server machines, the invention merely requires that the data streams from the streaming server pass through the EB.

Figure 3:
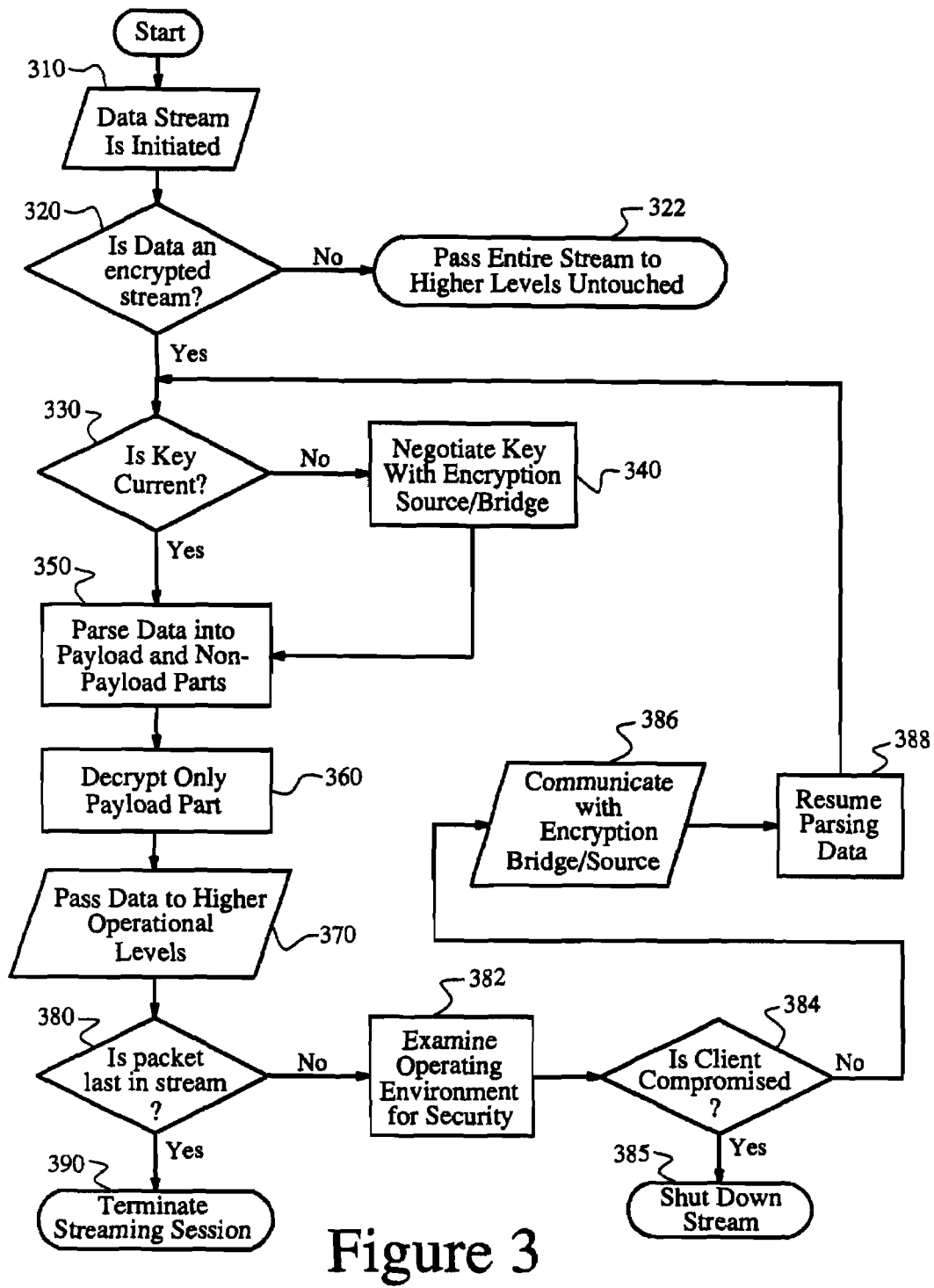
FIG. 3 is a flowchart of an exemplary decryption process.

The invention further provides a client system, also referred to as a decryption shim or simply a shim, which is a piece of transparent software that is downloaded to or pre-installed on the client machine (e.g. personal computer, network appliance or other network capable device) and used to decrypt incoming data streams from the EB on its way to the media player software. FIG. 3 is a flowchart of an exemplary decryption process of the decryption shim software performed at the client machine. The process comprises data streams as they are initiated 310; determining whether the data is an encrypted stream 320; ignoring the stream if it is not encrypted data 322; determining if the encryption key is current 330; negotiating a key with the encryption bridge/source if the key is not current 340; parsing the data into payload and nonpayload parts 350; decrypting only the payload part 360; passing the data to higher level operations (e.g. the media player) 370; determining whether the data is the last part of a stream 380; examining the operating environment for security 382; determining if the client environment is compromised (hacked, etc.) 384; shutting down the data stream if the client is compromised 385; communicating with the encryption bridge/source 386; resuming parsing data 388; and terminating the stream if the data was the last part of the stream 390.

Figure 4:
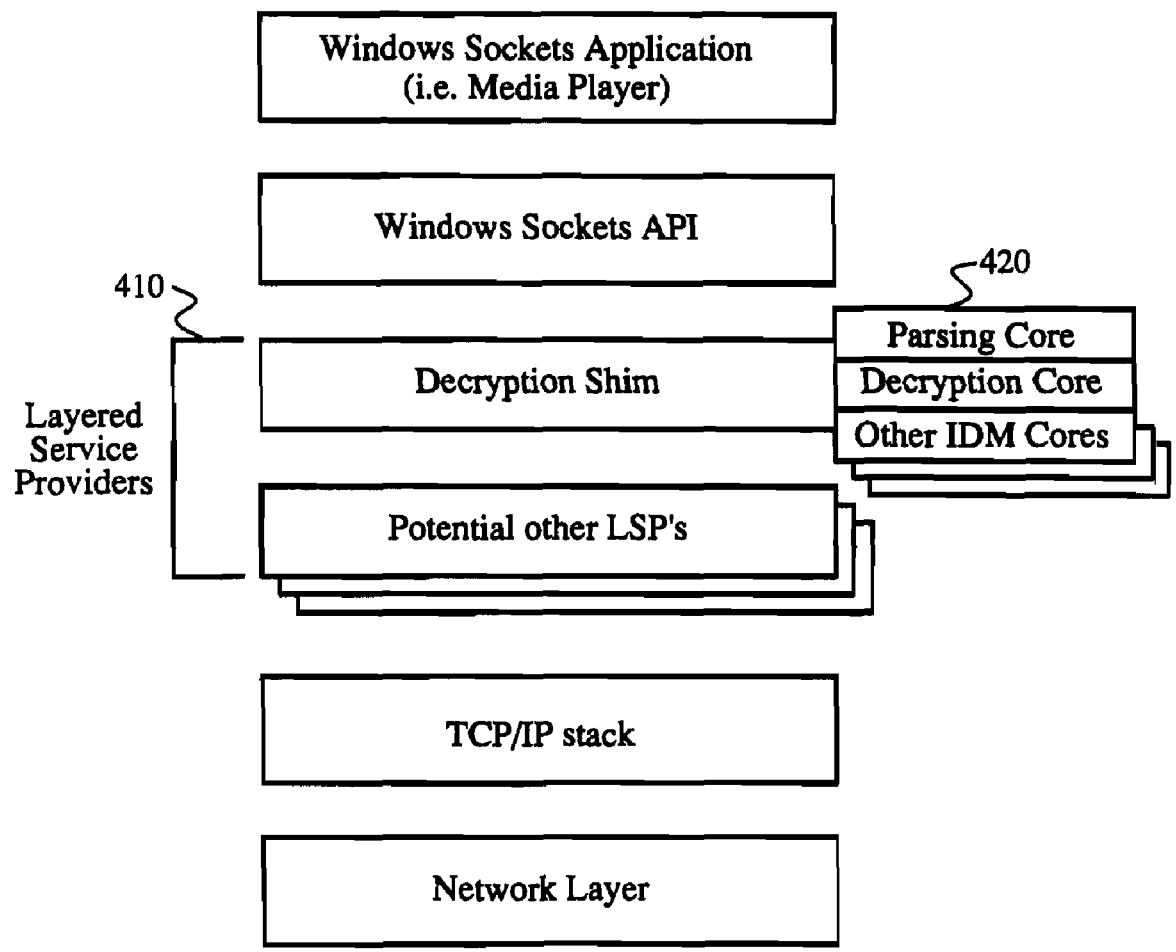
FIG. 4 is an exemplary diagram of a shim used in a Windows™ Sockets Network Architecture.
Figure 5:
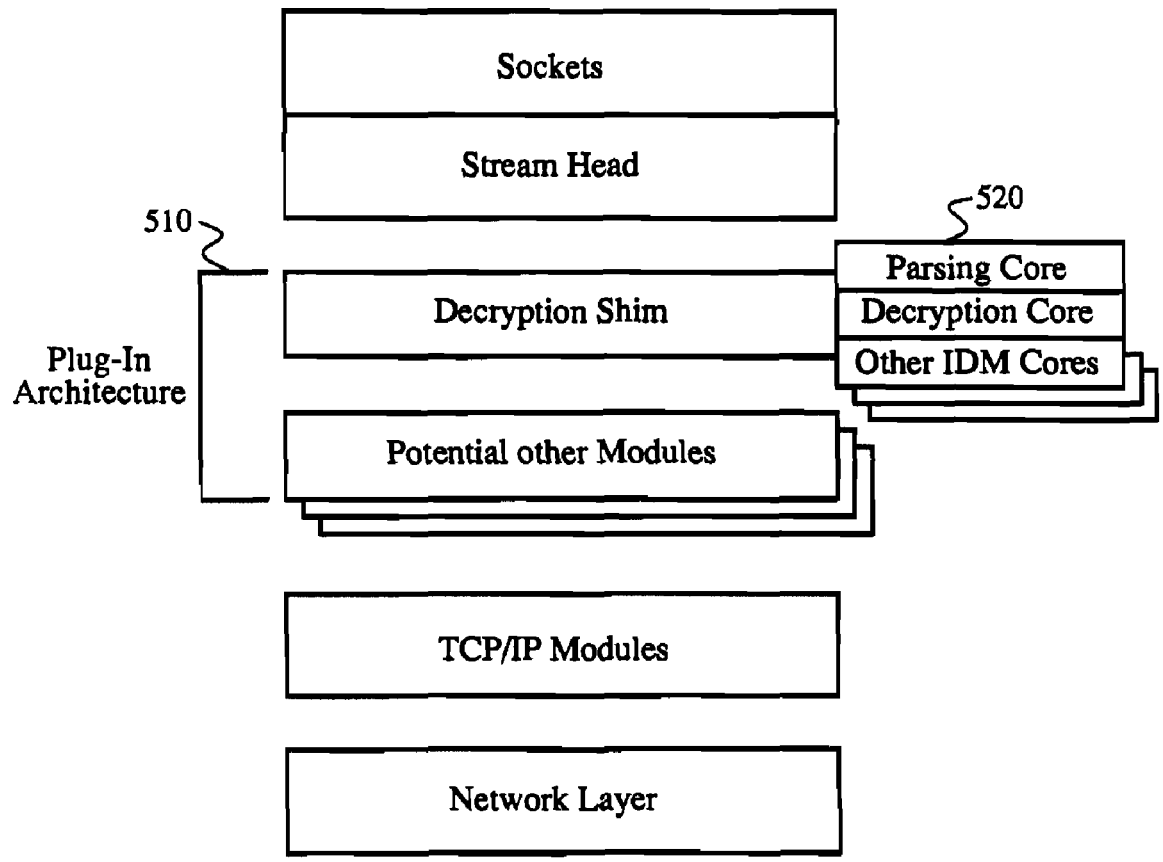
FIG. 5 is an exemplary diagram of a shim used in a Streams-Based Network Architecture.

Decryption is accomplished by adding a decryption shim 420 in a Layered Service Provider 410 in a Windows™ sockets network architecture as shown in FIG. 4 or a streams plug-in 510 in a streams based network architecture as shown in FIG. 5. FIG. 4 is an exemplary diagram of a Windows™ sockets network architecture. In the Windows™ networking architecture, decryption shim 420 is the highest most Layered Service Provider (LSP) so that an additional LSP cannot merely spool decrypted data out into an insecure environment. This can be extrapolated to other sockets based networking protocols as well. FIG. 5 is an exemplary diagram of a streams based network architecture. The diagram represents placement of the invention's shim 520 within a streams based architecture 510 such as that employed by current incarnations of Mac OS™ and some versions of Unix.

When a user requests data that is encrypted by the EB of the invention, the transparent software is installed via an Active-XTM Control, a well documented means to deliver executable programs to a Windows™ computer. The installation of the decryption shim is transparent to the user and does not cause a reboot, restart of the user's browser or require user interaction. Some exceptions such as the Mac OS™ and Windows NT™ or Windows 2000™ in secure environments or Linux or Unix based client machines because transparent installation requires administrative user privileges on the client machine and the ability of the client machine to receive programs via the Active-X™ mechanism.

After the last stream has finished, the decryption shim uninstalls as much of itself as possible, leaving only a small layer so that administrative user privileges are not required for future decryptions. The decryption shim is installed in volatile memory to reduce the changes of tampering by a third party.

After installation, the decryption shim decrypts only the data coming from the EB of the invention going to targeted players such as Windows Media™ Player, QuickTime™ Movie Player, Real Player™, etc. Decryption does not impact data targeted to other applications or media streams that are not encrypted by the EB of the invention.

The decryption shim runs on, for example, operating systems such as Windows 95™, Windows 98™, Windows ME™, Windows NT™, Windows 2000™ as well as Mac OS™ and numerous Linux and Unix distributions. Where Active-XTM based installation is possible, the installation of the decryption shim can be accomplished with most browsers such as Internet Explorer™ or Netscape™.

In sum, the EB of the invention drops in between the server and client and parses and encrypts a selected portion of the streamed data such as the media portion. As the stream is initiated, the decryption core is sent as part of the stream to the client side. The client can then decrypt the incoming data for the duration of the stream. If another stream is initiated, decryption occurs the same way. For each stream, the encryption keys can be set for the duration of the stream or changed during the stream duration to increase security.

As an example, a client may request privileges to get streaming data from a service provider's e-commerce system. The service provider's back-end (server infrastructure) will authorize the streaming server to initiate a stream. That stream is initiated through the EB. Once initiated, the stream is parsed and selectively encrypted by the EB before being passed out over the network. Encryption keys are exchanged, for example, by the Diffie-Hellman mechanism that is known in the field. Unique features of the invention include the parsing and selective encryption of only the payload part of the data stream and the ability to plug-in other key exchange mechanisms and encryption algorithms should customer or security needs dictate.

It will be apparent to one of ordinary skill in the art that the embodiments as described above may be implemented in many different embodiments of software, firmware and hardware in the entities illustrated in the figures. The actual software code or specialized control hardware used to implement the present invention is not limiting of the present invention. Thus, the operation and behavior of the embodiments were described without specific reference to the specific software code or specialized hardware components, it being understood that a person of ordinary skill in the art would be able to design software and control hardware to implement the embodiments based on the description herein.

What is claimed as new and desired to be proteceted by Letters Patent of the United States is:

1. An encryption bridge for selectively encrypting data to a client device, comprising:
   a network component that is configured to send and receive data over a network; and
   a processor that is operative to perform actions, including:
      receiving a packet;
      examining a payload portion of the packet for a predefined data type, and if the payload portion includes the predefined data type, selectively encrypting the payload portion and;
      employing, in part, the network component, to send the selectively encrypted payload portion in another packet towards another network device, over the network.

2. The encryption bridge of claim 1, wherein the processor is operative to perform actions, further comprising:
   if the payload portion does not include a recognized predefined data type, based on the examination, then
   employing, in part, the network component, to send the payload and non-payload portions towards another network device, over the network.

3. The encryption bridge of claim 1, wherein the processor is operative to perform actions, further comprising:
   downloading onto the other network device, a component that is configured to enable the other network device to decrypt the selectively encrypted payload portion of the other packet.

4. The encryption bridge of claim 3, wherein the processor is operative to perform actions, further comprising:
   exchanging encryption keys with the downloaded component for use in decrypting the selectively encrypted payload portion.

5. The encryption bridge of claim 1, wherein the processor is operative to perform actions, further comprising:
   if the other network device is compromised, terminating sending of packets to the other network device.

6. The encryption bridge of claim 1, wherein the predefined data types further comprises data associated with at least one of multimedia content, an electronic book, a medical record, a medical image, or financial data.

7. The encryption bridge of claim 1, where the processor is operative to perform actions, further comprising:
   parsing the packet into a payload portion and a non-payload portion.

8. The encryption bridge of claim 1, where the processor is operative to perform actions, further comprising:
   combining at least the non-payload portion and the selectively encrypted payload portion.

9. A computer-readable storage medium having computer-executable instructions for managing data over a network, the computer-executable instructions when installed onto a computing device enable the computing device to perform actions, comprising:
   receiving a stream of packets;
   examining a payload portion of each packet for a predefined data type, and if at least one of the payload portions includes the predefined data type, selectively encrypting the at least one payload portion; and
   streaming at least the selectively encrypted payload portions in packets over the network.

10. The computer-readable storage medium of claim 9, further comprising:
    negotiating an encryption/decryption key and key exchange with another computing device for use in decrypting of the streaming packets.

11. The computer-readable storage medium of claim 9, wherein the computing device to perform actions, further comprising:
    enabling downloading and installing of a component onto another computing device for use in decrypting the selectively encrypted payload portions of the streamed packets.

12. The computer-readable storage medium of claim 11, wherein the component is installed on the other computing device in volatile memory.

13. The computer-readable storage medium of claim 9, wherein the computing device to perform actions, further comprising:
    monitoring another computing device, to which the streamed network packets are being sent; and
    if it is determined that the other computing device is compromised, terminating the streaming of the packets.

14. The computer-readable storage medium of claim 9, wherein the computing device is configured to receive a different stream of network packets from a plurality of different servers, and to further provide streaming of network packets to a plurality of different client devices.

15. The computer-readable storage medium of claim 14, wherein each of the plurality of different client devices receives a stream of network packets selectively encrypted with a unique encryption key for the client device.

16. A system for managing data securely over a network, comprising:
    a first device that is operative to perform actions, including:
       receiving a packet;
       examining a payload portion of the packet for a predefined data type, and if the payload portion includes the predefined data type, selectively encrypting the payload portion and;

communicating the selectively encrypted portions over the network in a packet; and a second device that is operative to perform actions, including:
   receiving the communicated packet,
   parsing the received packet into the payload and the non-payload portion, and
   decrypting the selectively encrypted payload portion.

17. The system of claim 16, wherein:

The second device is operative to negotiate and exchange a key for use in at least one of encrypting or decrypting the selectively encrypted payload portion with another device.

* * * * *

UNITED STATES PATENT AND TRADEMARK OFFICE
CERTIFICATE OF CORRECTION

PATENT NO. : 7,376,831 B1
APPLICATION NO. : 11/467510
DATED : May 20, 2008
INVENTOR(S) : Kollmyer et al.

It is certified that error appears in the above-identified patent and that said Letters Patent is hereby corrected as shown below:

On the title page, in field (56), under "Other Publications", in column 2, line 2, delete "Standardizatin'" and insert -- Standardization --, therefor.

On the title page (56), page 3, under "Other Publications", in column 1, line 15, delete "Immage'" and insert -- Image --, therefor.

On the title page (56), page 3, under "Other Publications", in column 1, line 29, delete "Commu nication" and insert -- Communication --, therefor.

On the title page (56), page 3, under "Other Publications", in column 2, line 18, delete "Supposrting" and insert -- Supporting --, therefor.

On the title page (56), page 3, under "Other Publications", in column 2, line 20, delete "Effcient" and insert -- Efficient --, therefor.

In column 5, line 44, delete "DRAWING" and insert -- DRAWINGS --, therefor.

In column 6, line 47, delete "farther" and insert -- further --, therefor.

In column 7, line 28, delete "MediaTM" and insert -- Media$^{TM}$ --, therefor.

In column 10, line 34, delete "Active-XTM" and insert -- Active-X$^{TM}$ --, therefor.

In column 10, line 61, delete "Active-XTM" and insert -- Active-X$^{TM}$ --, therefor.

In column 11, line 31, delete "proteceted" and insert -- protected --, therefor.

UNITED STATES PATENT AND TRADEMARK OFFICE
CERTIFICATE OF CORRECTION

PATENT NO. : 7,376,831 B1
APPLICATION NO. : 11/467510
DATED : May 20, 2008
INVENTOR(S) : Kollmyer et al.

It is certified that error appears in the above-identified patent and that said Letters Patent is hereby corrected as shown below:

In column 11, line 43, in Claim 1, delete "portion and;" and insert -- portion; and --, therefor.

In column 12, line 67, in Claim 16, delete "portion and;" and insert -- portion; and --, therefor.

In column 14, line 2, in Claim 17, delete "The" and insert -- the --, therefor.

Signed and Sealed this

Twenty-sixth Day of August, 2008

JON W. DUDAS
*Director of the United States Patent and Trademark Office*

(12) INTER PARTES REEXAMINATION CERTIFICATE (0392nd)
United States Patent
Kollmyer et al.

(10) Number: US 7,376,831 C1
(45) Certificate Issued: *Jun. 19, 2012

(54) SELECTIVELY ENCRYPTING DIFFERENT PORTIONS OF DATA SENT OVER A NETWORK

(75) Inventors: Brad Kollmyer, Lynden, WA (US); Brian A. Baker, Mercer Island, WA (US); Eric Bradley Shapiro, Ann Arbor, MI (US); Aric Kollmyer, Mercer Island, WA (US); Mike Rutman, Gainesville, FL (US); Charles Duncan MacLean, Claremont, CA (US); Dan Robertson, Ann Arbor, MI (US); Neal Taylor, Yorba Linda, CA (US); Dick Hunsche, Ann Arbor, MI (US); Amanda Walker, Reston, VA (US)

(73) Assignee: Constellation Venture Capital II, L.P., New York, NY (US)

Reexamination Request:
No. 95/001,077, Sep. 2, 2008

Reexamination Certificate for:
Patent No.: 7,376,831
Issued: May 20, 2008
Appl. No.: 11/467,510
Filed: Aug. 25, 2006

(*) Notice: This patent is subject to a terminal disclaimer.

Certificate of Correction issued Aug. 26, 2008.

Related U.S. Application Data

(63) Continuation of application No. 09/656,166, filed on Sep. 6, 2000, now Pat. No. 7,165,175.

(51) Int. Cl.
*H04L 9/00* (2006.01)

(52) U.S. Cl. .................................. 713/154; 348/E7.056
(58) Field of Classification Search ........................ None
See application file for complete search history.

(56) References Cited

To view the complete listing of prior art documents cited during the proceeding for Reexamination Control Number 95/001,007, please refer to the USPTO's public Patent Application Information Retrieval (PAIR) system under the Display References tab.

*Primary Examiner* — Matthew Heneghan

(57) ABSTRACT

An apparatus, system, and method are directed towards parsing and selectively encrypting different portions of data in real-time, decrypting the encrypted data in real-time, and passing the data to a media player on a client computer or other network capable device. Data in a network packet may be parsed into payload and non-payload portions. The payload portion of the packet data may then be examined to determine whether a predefined type of the data is recognized. For example, in one embodiment, the predefined data type may be media content. If the payload portion is recognized as a predefined data type, then it may be selectively encrypted. The selectively encrypted payload portion and non-payload portion of the packet may then be combined, such that the non-payload portion may be employed by firewalls, proxies, and/or NATs to route the packet towards the client computer or other network capable device.

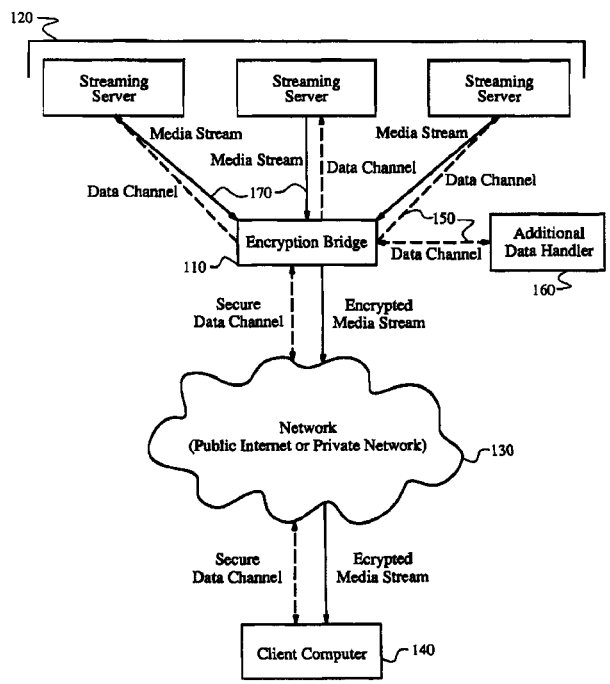

US 7,376,831 C1

INTER PARTES REEXAMINATION CERTIFICATE ISSUED UNDER 35 U.S.C. 316

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

The patentability of claims 1-17 is confirmed.

New claims 18-23 are added and determined to be patentable.

18. *An encryption bridge for selectively encrypting data to a client device, comprising:*
   *a network component that is configured to send and receive data over a network; and*
   *a processor that is operative to perform actions, including:*
      *receiving a packet;*
      *examining a payload portion of the packet for a predefined data type, and if the payload portion includes the predefined data type, selectively encrypting the payload portion; and*
      *employing, in part, the network component, to send the selectively encrypted payload portion in another packet towards another network device, over the network;*
      *downloading onto the other network device, a component that is configured to enable the other network device to decrypt the selectively encrypted payload portion of the other packet; and*
      *if the other network device is compromised, terminating sending of packets to the other network device.*

19. *The encryption bridge of claim 18, wherein the processor is operative to perform actions, further comprising:*
   *exchanging encryption keys with the downloaded component for use in decrypting the selectively encrypted payload portion.*

20. *The encryption bridge of claim 18, where the processor is operative to perform actions, further comprising:*
   *parsing the packet into a payload portion and a non-payload portion.*

21. *The encryption bridge of claim 20, where the processor is operative to perform actions, further comprising:*
   *combining the non-payload portion and the selectively encrypted payload portion.*

22. *A computer-readable storage medium having computer-executable instructions for managing data over a network, the computer-executable instructions when installed onto a computing device enable the computing device to perform actions, comprising:*
   *receiving a stream of packets;*
   *examining a payload portion of each packet for a predefined data type, and if at least one of the payload portions includes the predefined data type, selectively encrypting the at least one payload portion;*
   *streaming at least the selectively encrypted payload portions in packets over the network;*
   *enabling downloading and installing of a component onto another computing device for use in decrypting the selectively encrypted payload portions of the streamed packets;*
   *monitoring another computing device, to which the streamed network packets are being sent; and*
   *if it is determined that the other computing device is compromised, terminating the streaming of the packets.*

23. *An encryption bridge that is interposed between at least one streaming server and at least one client computer for selectively encrypting data to a client device, comprising:*
   *a network component that is configured to send and receive data over a network; and*
   *a processor that is operative to perform actions, including:*
      *receiving a packet streamed from the at least one streaming server over the network;*
      *examining a payload portion of the packet for a predefined data type, and if the payload portion includes the predefined data type, selectively encrypting the payload portion in real-time; and*
      *employing, in part, the network component, to stream the selectively encrypted payload portion in another packet towards the at least one client computer, over the network.*

* * * * *